(12) United States Patent
Aratani et al.

(10) Patent No.: US 7,652,679 B2
(45) Date of Patent: Jan. 26, 2010

(54) IMAGE DISPLAY METHOD, PROGRAM, IMAGE DISPLAY APPARATUS AND IMAGE DISPLAY SYSTEM

(75) Inventors: Shuntaro Aratani, Tokyo (JP); Tomoyuki Ohno, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 11/064,832

(22) Filed: Feb. 25, 2005

(65) Prior Publication Data
US 2005/0197578 A1 Sep. 8, 2005

(30) Foreign Application Priority Data
Mar. 3, 2004 (JP) ............... 2004-058889
Feb. 10, 2005 (JP) ............... 2005-034854

(51) Int. Cl.
*G09G 5/00* (2006.01)
(52) U.S. Cl. ...................... 345/629; 345/640
(58) Field of Classification Search ............... 345/629, 345/640
See application file for complete search history.

(56) References Cited

U.S. PATENT DOCUMENTS

| | | | | |
|---|---|---|---|---|
| 5,586,196 A | * | 12/1996 | Sussman | 382/114 |
| 5,815,137 A | * | 9/1998 | Weatherford et al. | 715/861 |
| 6,353,450 B1 | * | 3/2002 | DeLeeuw | 715/768 |
| 6,377,282 B1 | * | 4/2002 | Champion | 715/726 |
| 6,483,874 B1 | * | 11/2002 | Panusopone et al. | 375/240.08 |
| 6,943,774 B2 | * | 9/2005 | Horiki | 345/158 |
| 6,981,227 B1 | * | 12/2005 | Taylor | 715/768 |
| 7,039,676 B1 | * | 5/2006 | Day et al. | 709/204 |
| 2004/0193413 A1 | * | 9/2004 | Wilson et al. | 704/243 |

FOREIGN PATENT DOCUMENTS

| | | |
|---|---|---|
| JP | 6-301476 | 10/1994 |
| JP | 8-139994 | 5/1996 |
| JP | 2003-125369 | 4/2003 |

\* cited by examiner

*Primary Examiner*—Xiao M Wu
*Assistant Examiner*—Maurice McDowell, Jr.
(74) *Attorney, Agent, or Firm*—Fitzpatrick, Cella, Harper & Scinto (57) ABSTRACT

An image display method includes a display step of synthesizing and displaying a predetermined image and a moving image, a detecting step of detecting a specific target in the moving image, and a decision step of deciding whether the specific target detected in the moving image is positioned to be overlapping with the predetermined image. In addition, a signal processing step displays a predetermined mark at a position of the detected specific target, if it is decided that the specific target detected in the moving image is positioned to be overlapping with the predetermined image.

5 Claims, 8 Drawing Sheets

FIG. 12 ature of the present invention, there is
IMAGE DISPLAY METHOD, PROGRAM, IMAGE DISPLAY APPARATUS AND IMAGE DISPLAY SYSTEM

BACKGROUND OF THE INVENTION

1. Field of the Invention

The present invention relates to an image display method, a program, an image display apparatus and an image display system.

2. Related Background Art

Japanese Patent Application Laid-Open No. H08-139994 discloses the technique of synthesizing a portrait picture and an image generated by a computer, displaying a synthesis image, moving the image generated by the computer and changing the size thereof, in accordance with a specific object such as the hand of a user.

With this technique, however, although a conversation is possible while a desired image is pointed with a finger, a conversation is impossible while a portion of an image is pointed with a finger.

In order to realize pleasant conversation with families or friends while looking at a photograph, it is desired to make conversations such as "This person is . . . " and "A building in this picture is . . . " while a portion of a person or a thing in the photograph is pointed with a finger.

Japanese Patent Application Laid-Open No. H06-301476 discloses the other well-know technique of fetching a real image and detecting a particular shape of the real image to display a synthesis image having a virtual image in front of the real image.

Japanese Patent Application Laid-Open No. 2003-125369 discloses the technique of calculating a probability that each pixel in a frame of an input image is positioned within an object, and synthesizing the input image and a background image by using as a transparency the value of each pixel based on the probability.

SUMMARY OF THE INVENTION

It is an objective of the present invention to provide a novel display method capable of identifying a portion of an image.

According to a first aspect of the present invention, there is provided an image display method: a display step of displaying a predetermined image and a dynamic image; a decision step of deciding whether a specific target in said dynamic image is positioned within a display area of said predetermined image; and a signal generating step of, in the state that said specific target is positioned within said display area, generating a signal for displaying an image wherein a target image and an overlapped portion of said predetermined image with said specific target are synthesized on the image, said target image comprising at least one of said specific target and a mark whose position is designated by a position of said specific target, so as to allow, said target image and the overlapped portion of said predetermined image with said target image, to be visible.

According to a second aspect of the present invention, there is provided a program comprising: a display step of displaying a predetermined image and a dynamic image; a decision step of deciding whether a specific target in said dynamic image is positioned within a display area of said predetermined image; and a signal generating step of, in the state that said specific target is positioned within said display area, generating a signal for displaying an image wherein a target image and an overlapped portion of said predetermined image with said specific target are synthesized on the image, said target image comprising at least one of said specific target and a mark whose position is designated by a position of said specific target, so as to allow, said target image and the overlapped portion of said predetermined image with said target image, to be visible.

According to a third aspect of the present invention, there is provided an image displaying apparatus comprising: a display unit for displaying a predetermined image and a dynamic image; a decision unit for deciding whether a specific target in said dynamic image is positioned within a display area of said predetermined image; and a signal generating circuit for, in the state that said specific target is positioned within said display area, generating a signal for displaying an image wherein a target image and an overlapped portion of said predetermined image with said specific target are synthesized on the image, said target image comprising at least one of said specific target and a mark whose position is designated by a position of said specific target, so as to allow, said target image and the overlapped portion of said predetermined image with said target image, to be visible.

DETAILED DESCRIPTION OF THE PREFERRED EMBODIMENTS

First Embodiment

Figure 1:
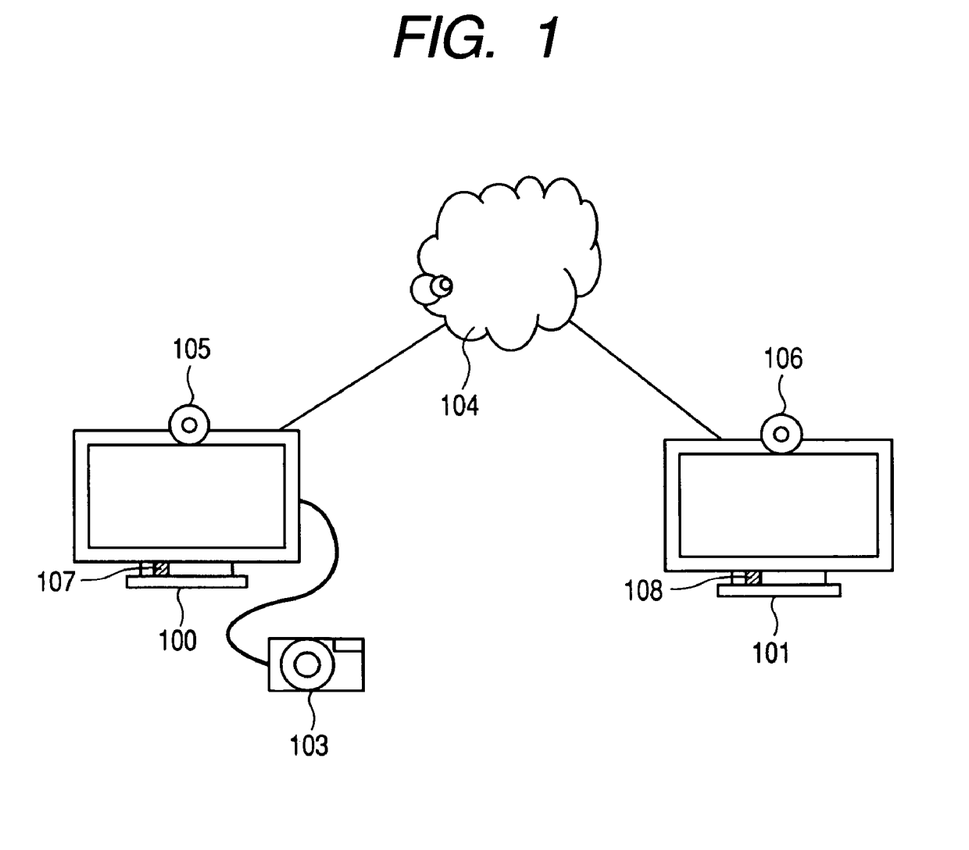
FIG. 1 is a diagram showing the configuration of a television communications system according to a first embodiment.

First, description will be made on a television communications system capable of properly adopting an image display method according to the present invention. FIG. 1 is a diagram showing he configuration of the television communications system according to the first embodiment.

A digital television 100 and a digital television 101 as image display apparatuses are interconnected via an Internet line 104. A user photographing camera (hereinafter called a portrait camera) 105 as an imaging device and a microphone 107 are connected to the digital television 100, and a portrait camera 106 as the imaging device and a microphone 108 are connected to the digital television 101. A digital camera 103 recording digital photographs to be viewed by users is connected to the digital television 100.

(Description of Each Part)

Figure 2:
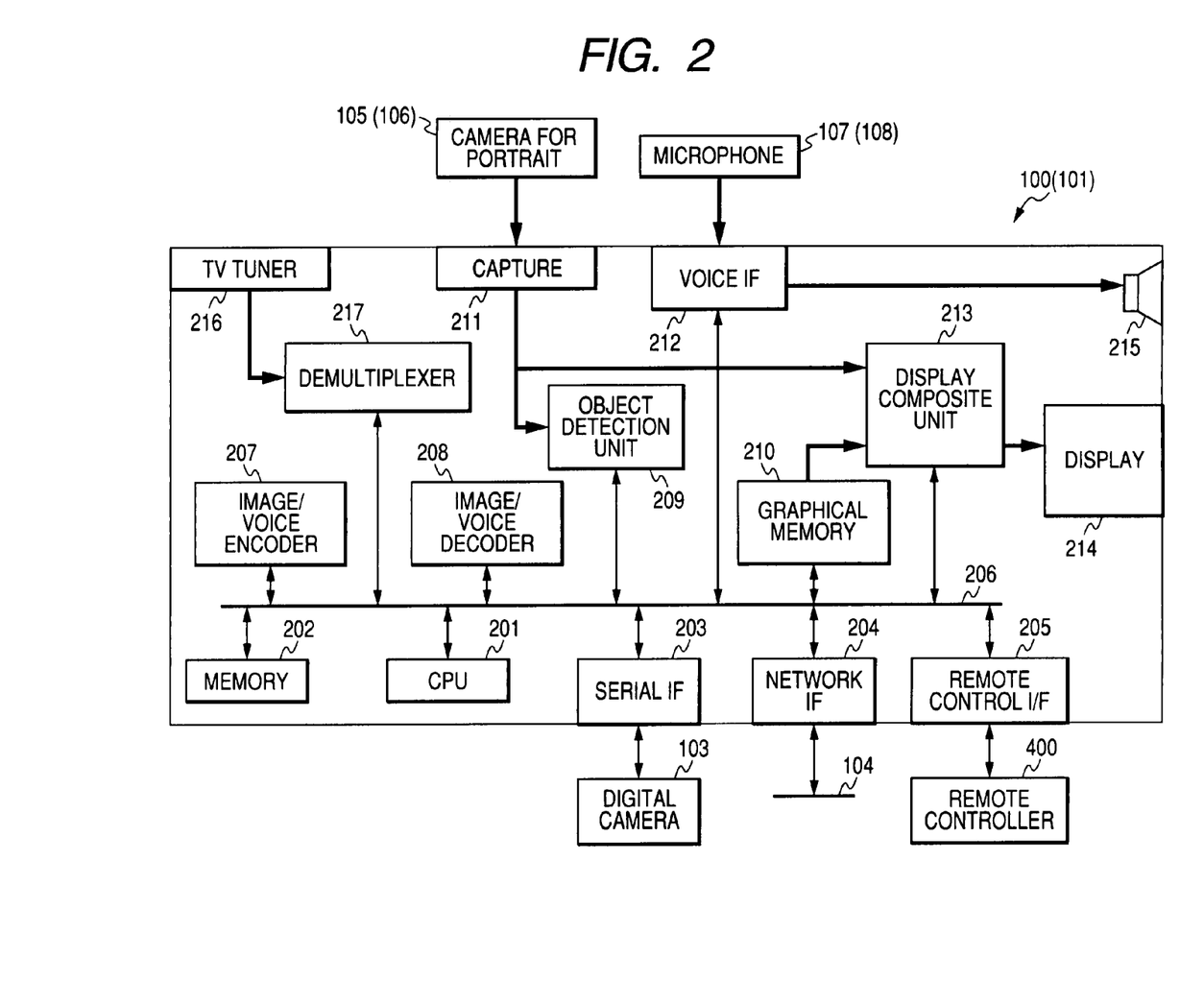
FIG. 2 is a block diagram of a digital television 100, 101 of the first embodiment.

FIG. 2 is a block diagram of the digital television 100, 101 of the first embodiment.

Referring to FIG. 2, a signal received at an unrepresented antenna is input to a TV tuner 216. The TV tuner 216 subjects the input signal to processes such as demodulation and error correction to thereby generate digital data of a format called transport stream (TS) data. The TV tuner 216 subjects the generated TS data to a descrambling process and outputs the result to a demultiplexer 217.

The demultiplexer 217 extracts image data and voice data from the TS data time divisionally multiplexed in which contained are image data and voice data of a plurality of channels, electronic program guide (EPG) data, data broadcast data and other data respectively input from a TV tuner 216, and sends the extracted image data and voice data to an image/voice decoder 208 via a bus 206. The image data processed by the image/voice decoder 208 is written in a graphical memory 210 via the bus 206, and output to a display 214 via a display synthesis unit 213. Voice data input from a microphone 107 (108) is converted into a voice signal via a voice interface (IF) 212 and output from a speaker 215.

Picture data recorded in the digital camera 103 is read via a serial interface 203 and recorded in a memory 202. The picture data is decoded by an image/voice decoder 208 and written in the graphical memory 210.

A video capture unit 211 fetches a user image from the portrait camera 105 (106) and sends it to the display synthesis unit 213 which is a signal generator circuit for generating a synthesis signal for synthesis display. In accordance with a signal supplied from the display synthesis unit 213, the display 214 displays a synthesis image.

A user image is supplied to an image/voice encoder 207 via the bus 206 to be subjected to a data compression process, and then sent to a network interface 204 to be transmitted to another digital television via the Internet line 104. Voice signals from the microphone 107 (108) is also subjected to the data compression process at the image/voice encoder 207 and transmitted to another (partner) digital television via a voice interface 212, the bus 206 and the network interface 204.

An object detection unit 209 detects a specific object contained in a user image supplied from the portrait camera 105 (106) or in a user image at a partner digital television received via the network interface 204.

As a user operates a remote controller 400, user input information is acquired via a remote control interface 205.

A CPU 201 controls internal processes of the digital television. More specifically, CPU 201 executes and controls the signal processing to be described hereunder, in accordance with specific programs stored in the memory 202.

Figure 4:
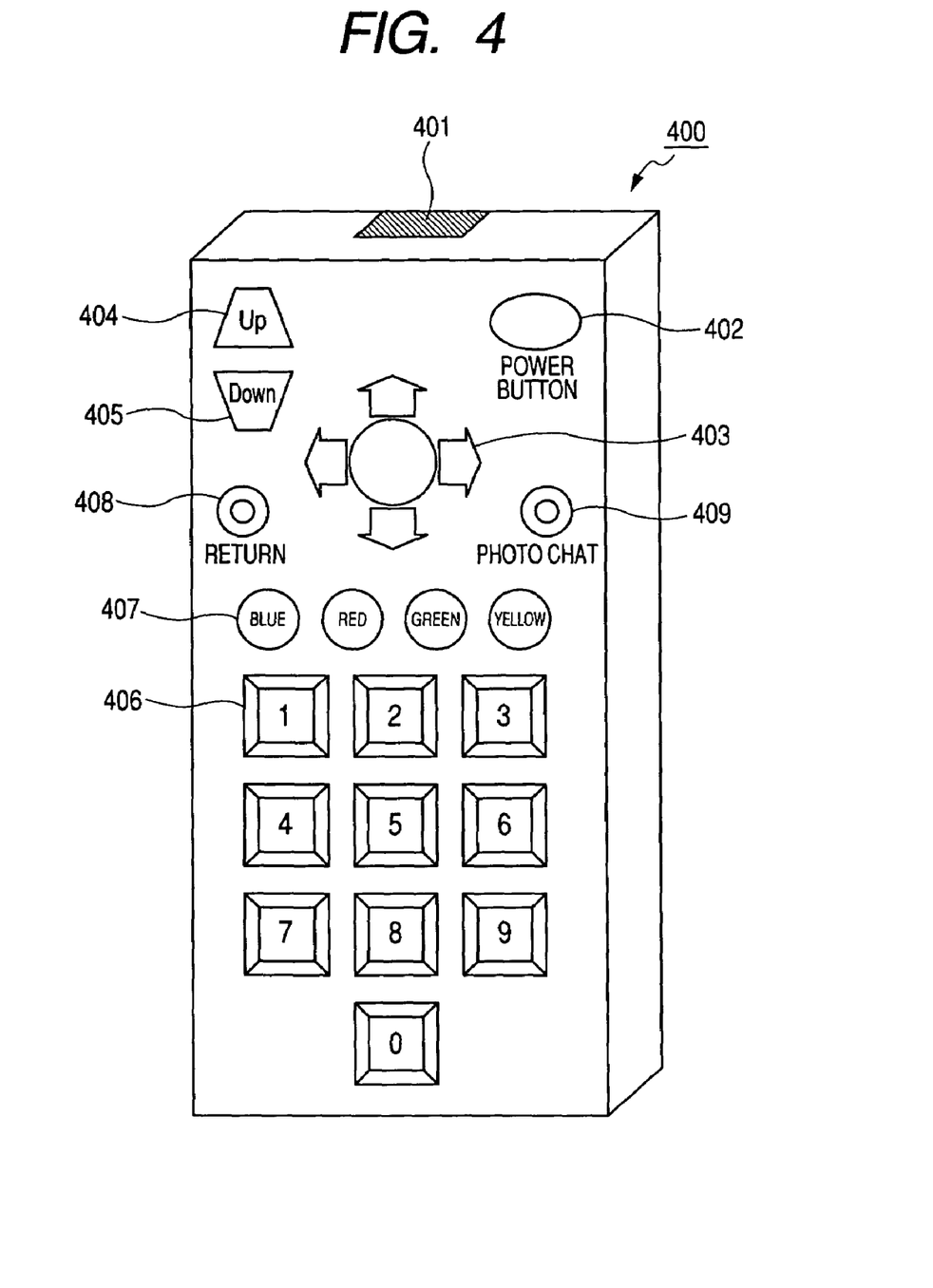
FIG. 4 is a schematic perspective view of a remote controller used by each embodiment.

FIG. 4 is a schematic perspective view of the remote controller 400 used in the first embodiment. For the remote controller 400 shown in FIG. 4, only buttons for realizing the functions necessary for the description of the first embodiment are shown, and the number of necessary buttons and their layout of an actual receiver are not limited to this embodiment.

Referring to FIG. 4, an infrared light emission unit 401 performs infrared communications between the remote controller 400 and the remote control interface 205 shown in FIG. 2. A power key 402 is used for turning on/off the power source of the remote controller 400. A cursor/decision key 403 is constituted of a key group having a decision key disposed in the area surrounded by up, down, right and left keys. Also disposed are two up/down keys including an Up key 404 and a Down key 405. Numerical keys 406 include "1" to "9" and "0" keys disposed in a matrix shape. Color keys 407 include four blue, red, green and yellow buttons disposed in a lateral row. A photo chat key 409 is used for calling a "photo chart function" for communications with another television user while viewing images.

Digital image data used in this embodiment is still image data of an image photographed with a digital camera. The still image data to be used is subjected to a JPEG compression process in the digital camera, and thereafter recorded in a memory card as a still image data file. In the following description, an "image file" is intended to mean still image data. Image data to be used in the present invention is not necessarily limited to still image data, but moving or dynamic image data may also be used. For example, it is possible to use still image data and dynamic image data of images photographed with a digital camera, a digital video camera, a camera equipped with a portable apparatus (such as a portable phone) or other cameras.

(Description of Processes)

Figure 3:
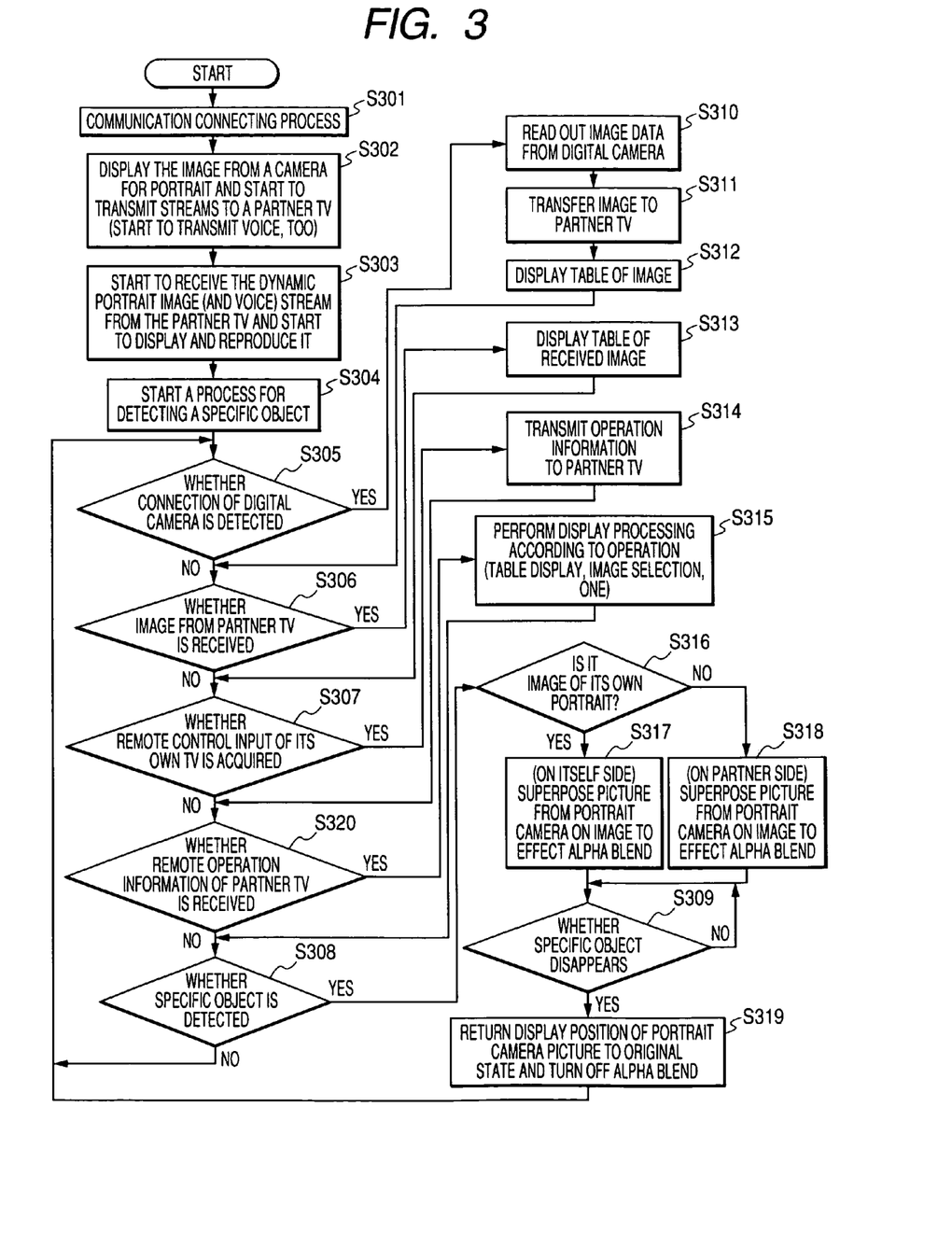
FIG. 3 is a flow chart illustrating the process to be executed by a CPU 201 according to the first embodiment.

Next, description will be made on the processes to be executed by CPU 201 for a "photo chat" application embodying the image display method of the present invention. FIG. 3 is a flow chart illustrating the processes to be executed by CPU 201 according to the first embodiment.

(Start of Photo Chat)

As both users at the digital televisions 100 and 101 depress the "photo chat" keys 409 of the remote controller 400 shown in FIG. 4, CPU 201 starts the processes shown in FIG. 3.

First, CPU 201 executes a communication connecting process with a partner digital television registered in advance (S301). Thereafter, a picture photographed with the portrait camera 105 (106) displayed on the display 214 via the display synthesis unit 213 by reversing right and left sides, together with a voice signal from the microphone 107 (108), is transmitted to the partner digital television via the network interface 204.

Image/voice information transmitted from the partner digital television starts being received at the network interface 204 and decoded in the image/voice decoder 208. Image data is drawn in the graphical memory 210 and displayed on the display 214 (by reversing right and left sides), and voice data is reproduced at the speaker 215 via the voice interface 212 (S303).

After image/voice data is input to a plurality of digital televisions in the manner described above, a process of detecting a specific object starts.

When it is detected that a user of the digital television 100 connects the digital camera 103 (S305), CPU 201 reads image data via the serial interface 203 (S310) and transmits it to the partner digital television (S311). The image data is drawn in the graphical memory to display a table of images (S312). Upon reception of image data sent from the partner digital television 101, similarly the image data is drawn in the graphical memory 210 and a table of images is displayed (S313).

Figure 5:
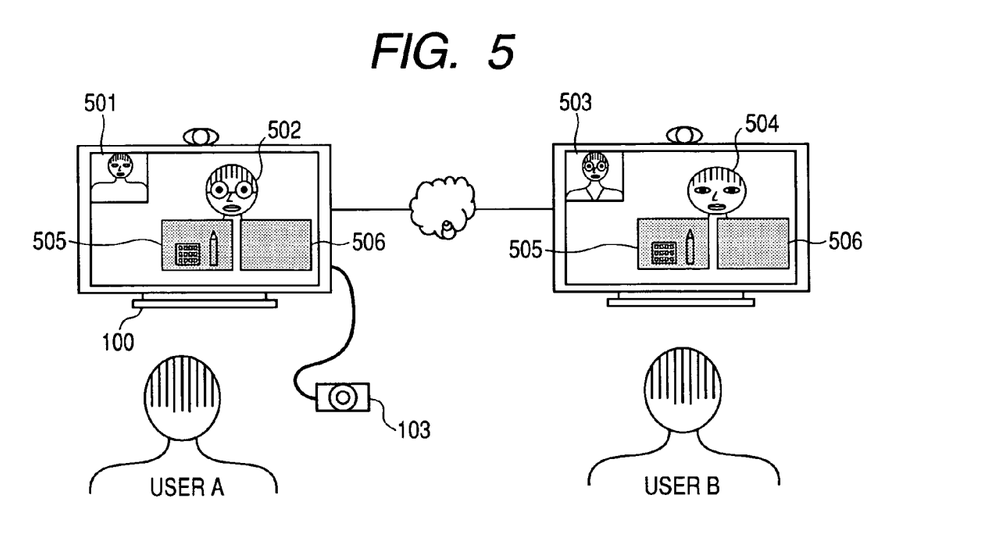
FIG. 5 is a schematic diagram showing an example of a table display immediately after users start a photo chat function.

FIG. 5 is a schematic diagram showing an example of a table display immediately after users start a photo chat function. In areas 501 and 503 shown in FIG. 5, user (own) images are displayed, and in areas 502 and 504, partner images are displayed. Both own images and partner images are displayed in the reversed state of right and left sides.

In areas 505 and 506 shown in FIG. 5, a table of predetermined pictures (two pictures) acquired from the digital video camera 103 is displayed by partially hiding the partner images.

In the state shown in FIG. 5, a user A or a user B can select and display a desired image by operating the cursor/decision key 403 of the remote controller 400. Upon acquisition of an input from the remote controller 400, CPU 201 transmits the acquired remote controller operation information to the partner digital television (S314). Similarly, upon reception of remote controller operation information from the partner digital television (S320), a drawing process corresponding to the remote control operation is executed to change a selected image, to change a table display to one sheet display, or to perform another operation (S315)

(Specific Object Detection Process)

Figure 8:
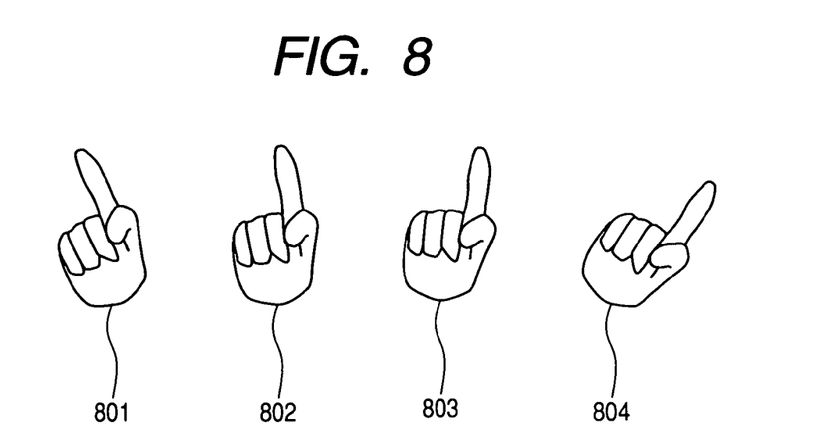
FIG. 8 is a schematic diagram showing examples of specific objects used by each embodiment.

The object detection unit 209 always analyzes the user image to judge whether a specific object (specific target) exists in the image. In the first embodiment, the shape of a hand pointing a thing, such as shapes 801 to 804 of a hand shown in FIG. 8, are defined as the specific objects. It is judged whether an image similar to the specific object exists in the image, and if it exists, it is judged whether the similar image exists in which portion of the image, and this judgement result is output. In the specific object detection process, a pattern similar to the object is searched from the image, and if the object is detected, similarity of color and contour is further judged.

(Synthesis Control According to Detection Result During Table Display)

When the object detection unit 209 detects an existence of a specific object in the user image on the own digital television side (S308), the picture taken with the portrait camera is moved to the position superposing upon or overlapping a portion of the displayed table of images (S317). Namely, the positions of both the portrait image and the image are adjusted so that at least a portion of the user image is positioned within a display area of the image. The image display area is the whole area surrounded by an outer periphery of the display image.

At the same time, the partner portrait image is moved to the upper right corner of the screen.

If the specific object and the image are superposed or overlapped in the user image, i.e., if the specific object exists in the image display area, the specific object and the image are synthesized in order to allow visual recognition of the specific object and the image. CPU 201 constitutes a judgement unit for judging whether a specific object positions within the image display area.

As a synthesizing approach, an alpha blend can be preferably adopted which represents a ratio of a moving image (wholly or partially) by an alpha and a ratio of a synthesis image at least including the image by (1-alpha). Another synthesizing method can also be applied which extracts the contour of a specific object and the contour of the specific object and the image are synthesized.

The alpha blend is a process of synthesizing a plurality of images formed in a superposed area at a constant ratio (alpha value). Namely, the alpha value means a synthesis ratio. The alpha value takes 0 to 1.0, and at the alpha value of 0 or 1.0, only one image is displayed. At the alpha value of $0<\alpha<1.0$, both the displayed image and the user image are synthesized and displayed.

In this embodiment, if the image is superposed in the specific object area, the alpha value of the alpha blend for the user image is set to:

$$0<\alpha<1,$$

whereas if the image is not superposed in the specific object area, the alpha value of the alpha blend for the user image is set to:

$$\alpha=0 \text{ (only the image is displayed) (S317)}.$$

If the specific object is detected in the portrait image sent from the partner (since the partner portrait image is initially in a superposed area upon the table of images, the image display position will not change), and if the image is superposed upon the specific object in the user image, the alpha value of the alpha blend for the user image is set to:

$$0<\alpha<1,$$

whereas if the image is not superposed in the specific object area, the alpha value of the alpha blend for the user image is set to:

$$\alpha=0 \text{ (only the image is displayed) (S318)}.$$

Figure 6:
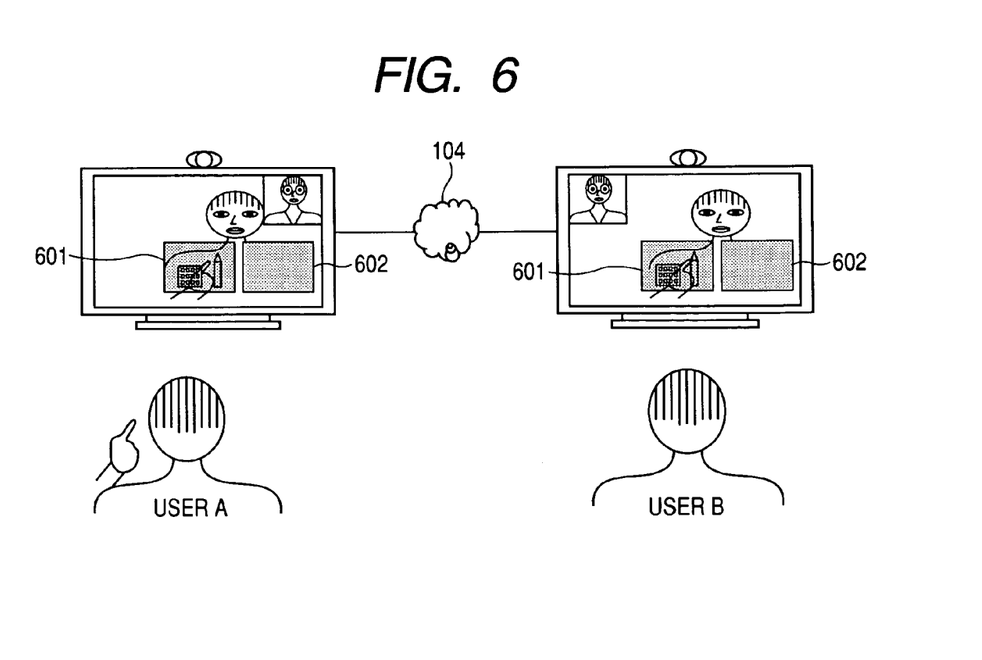
FIG. 6 is a schematic diagram showing a display example after a specific object is detected on a user image.

FIG. 6 is a schematic diagram showing a display example after the specific object is detected in the user image. When the object detection unit 209 detects a specific object, a picture of the user (user A) pointing with a finger is displayed at the position where both the images superpose upon the table of images. Of the two images 601 and 602 in the table of images, for the image 601 at the position where the detected object is superposed upon the image, the alpha blend ($0<\alpha<1$) with the user image is effected, and for the image 602 at the position where the detected object is not superposed upon the image, the alpha blend ($\alpha=0$) with the user image is effected, i.e., the user image is not displayed but only the image is displayed.

If the object detection unit 209 judges that the specific object disappears (S309), CPU 201 controls the graphical memory 210 and display synthesis unit 213 to recover the display state shown in FIG. 5 (S319).

(One Sheet Display Operation)

Figure 7:
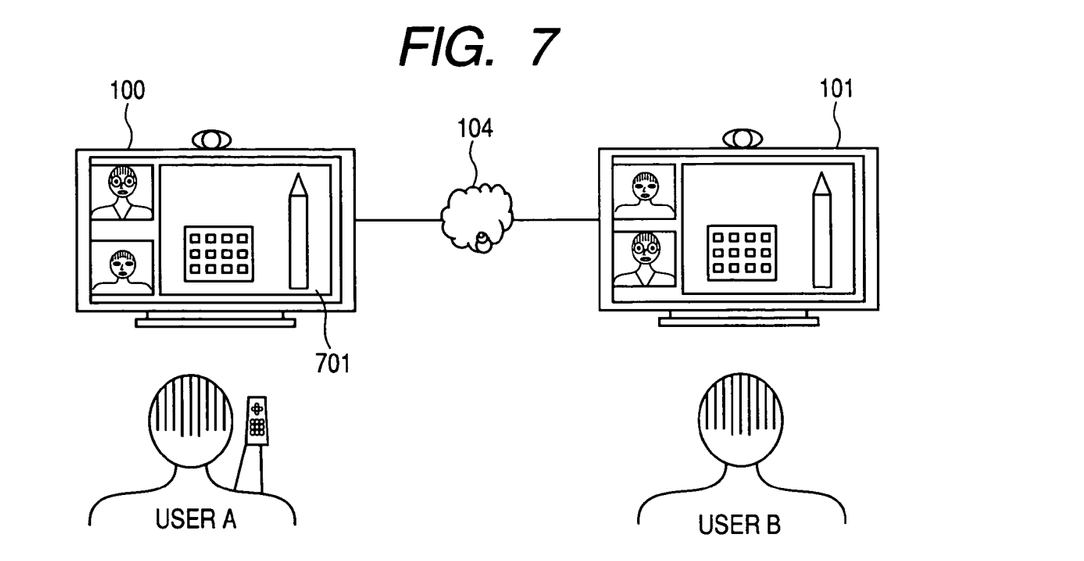
FIG. 7 is a schematic diagram showing a display example after a user switches to one sheet display by operating a remote controller.

Next, description will be made on the operation to be executed when the user A or B operates the remote controller 400 and displays only one image. FIG. 7 is a schematic diagram illustrating that a user operates the remote controller and changes the display state to one sheet display.

When one user operates the remote controller and changes the displayed image and display style (table display and one sheet display), the displays on both the digital televisions are changed synchronously (S314, S315). In the first embodiment, the users A and B are displayed vertically in the left areas of the displays of the digital televisions 100 and 101, and an image externally read is displayed in the right areas.

In this state, when the user A takes a pose pointing the image 701 with a finger, the object detection unit 209 of the digital television 100 detects an existence of the specific object (S308), and the picture taken with the portrait camera moves to the position where the picture is superposed upon the displayed image 701, and the display synthesis unit 213 effects the alpha blend process for the picture taken with the portrait camera and the displayed image ($0<\alpha<1$) (S317).

On the other hand, the object detection unit 209 of the digital television 101 detects an existence of the specific object in the received user image which is displayed at the same position as that of the displayed image, and the alpha blend process is effected ($0<\alpha<1$) (S318).

Figure 9:
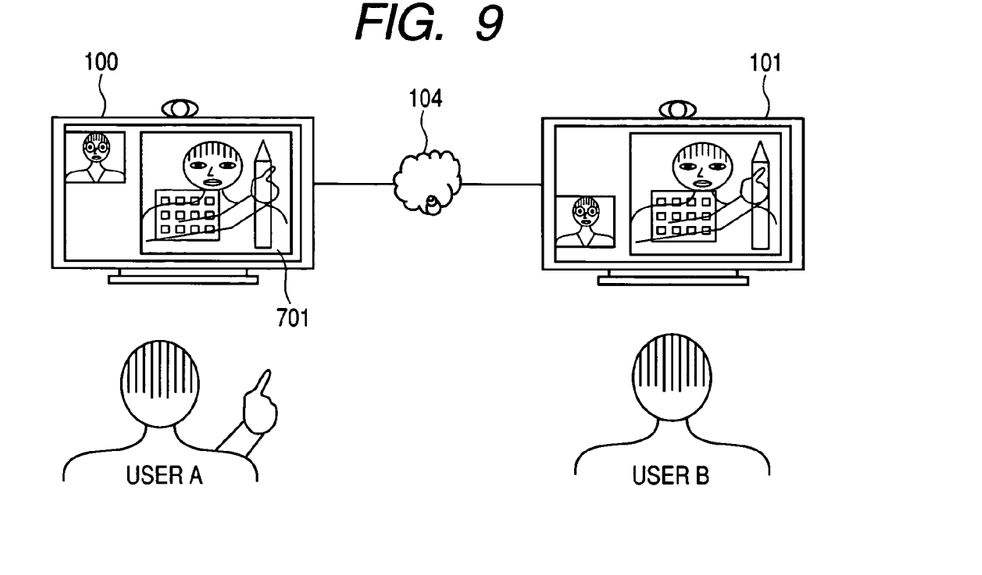
FIG. 9 is a diagram showing the state that image data and a user image are displayed subjected to an alpha blend process after a specific object is detected in a user image.

FIG. 9 shows the display state after the synthesizing process through the alpha blend process of the image data and the picture of the user A.

Figure 10:
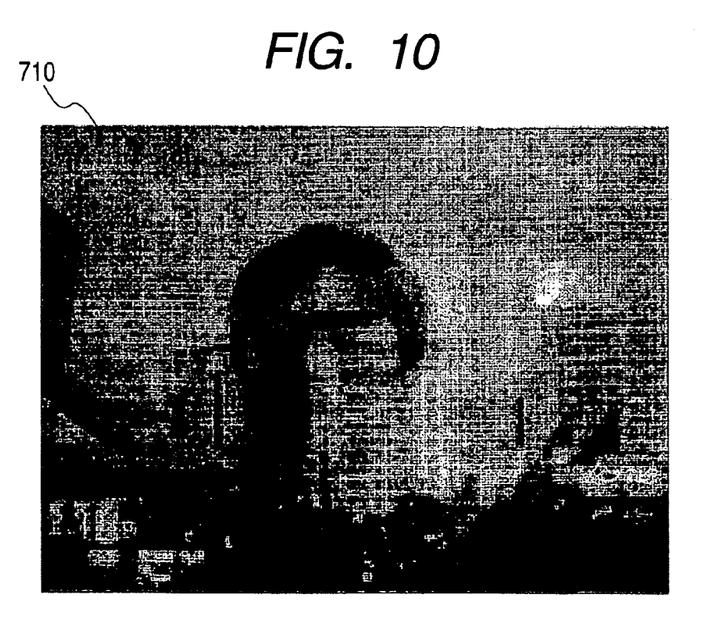
FIG. 10 is a diagram showing an example of a user image and a picture actually synthesized.

FIG. 10 shows an example of actual user image and image data synthesized. As the user A takes a pose pointing with a finger, the portrait image and the displayed image subjected to the alpha blend process are displayed by reversing the right and left sides, such as the image 710. Therefore, the user can easily point a portion of the image with a finger by moving the hand as if the user looks at a mirror with the transferred image.

On the other hand, in the partner digital television, the picture of the user A and the displayed image are subjected to the alpha blend process. The user B can view the user A as if the user A points a portion of the image with a finger at the back of a glass plate to which the image is transferred, so that the user B can intuitively recognize the pointed portion.

In the above description, as the most suitable example, both the digital televisions 100 and 101 have the synthesis display function. The invention is not limited only thereto.

For example, the digital television 101 may not be provided with the synthesis display function. In this case, the digital television 100 synthesizes moving image data generated by the portrait camera 106 and a still image in the manner described above, and the synthesized result is transmitted from the digital television 100 to the digital television 101 so that the same synthesis image can be displayed on both the digital televisions 100 and 101.

Instead of the configuration that moving image data of the portrait camera 105 or 106 is transmitted to the partner digital television 101 or 100, moving image data may be transmitted from a portrait camera 105 or 106 equipped with a communication circuit, without involvement of the portrait camera 105 or 106 directly connected to the digital television (the portrait camera 105 is directly connected to the digital television 100 and the portrait camera 106 is directly connected to the digital television 101).

Second Embodiment

Next, the second embodiment of the present invention will be described. In the first embodiment, when a specific object is detected, the user image is displayed at the same position as that of the displayed image, and the whole image and the user image are subjected to the alpha blend process. The second embodiment has a definite different point that different alpha values are used for different portions of a specific object.

Also in this embodiment, although CPU 201 performs basically similar operations to those shown in FIG. 3, the alpha value control processes at S317 and S318 are different.

More specifically, when a specific object is detected in a user image, an alpha value for a specific object area in the user image is set to:

$\alpha=1.0$ whereas an alpha value for the area other than the specific object area is set to:

$0<\alpha<1$.

Figure 11:
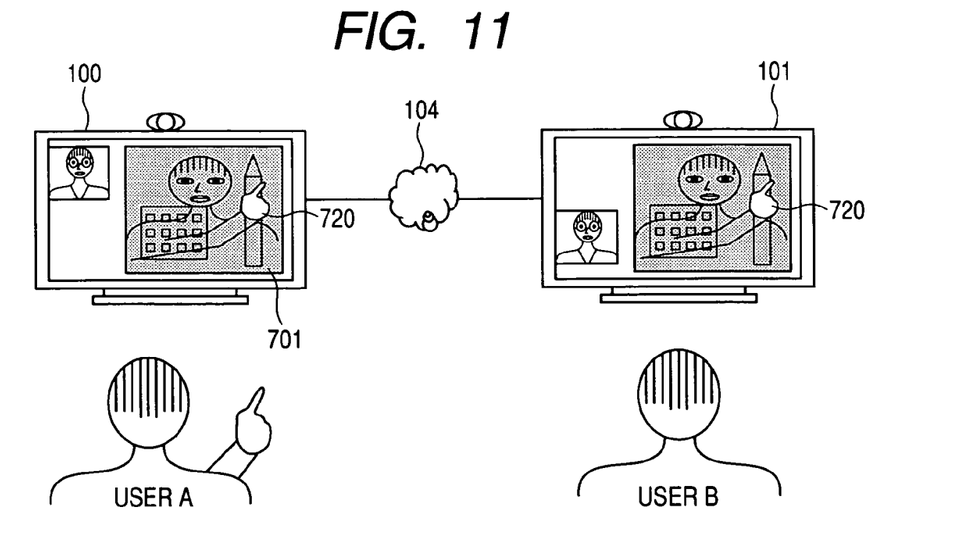
FIG. 11 is a diagram showing a display example when only a specific object area is displayed at an alpha value of "1", according to a second embodiment.

FIG. 11 is a diagram showing an example of a specific object area 720 displayed at the alpha value of 1 according to the second embodiment. As described earlier, at the alpha value of "1" of the specific object, only the specific object, the hand of a user pointing with a finger, is displayed on the front surface of the image, and the other portions are displayed as the synthesis image and user image like the first embodiment. It is therefore easier for the user to specify a portion of the image.

In this embodiment, although the alpha value of the specific object area is set to "1", it may be set smaller than 1. In this case, in order to allow a user to easily specify a portion of the image, it is preferable to set the alpha value of the area other than the specific object area, smaller than that of the specific object area in the user image.

Third Embodiment

Next, the third embodiment of the present invention will be described. This embodiment is different from the first embodiment in that a portion of a specific object is replaced with a prepared image. Also in this embodiment, although CPU 201 performs basically similar operations to those shown in FIG. 3, the alpha value control processes at S317 and S318 are different. When a specific object is detected in a user image, the specific object area is replaced with a prepared image, and the area other than the specific object area is controlled to be:

$\alpha<1$.

Figure 12:
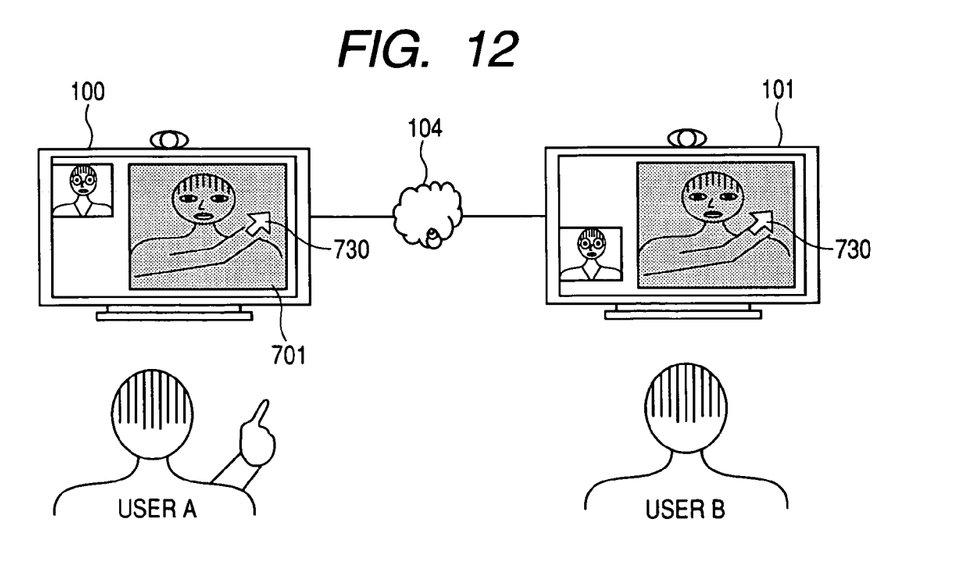
FIG. 12 is a diagram showing a display example when a particular area is replaced with another image, according to a third embodiment.

FIG. 12 is a diagram showing an example of a specific object area replaced with another image according to the third embodiment. A portion of the specific object area is replaced with a prepared mark image such as an arrow type pointer 730, and the other portions are displayed as the synthesis image and user image like the first embodiment. It is therefore easier for the user to specify a portion of the image.

A portion of the specific object and the mark image may be displayed at the same time. For example, if the specific object of the hand of a user, the image of the hand and the tip of an index finger as a mark constituted of high luminance points may be displayed.

As described above in detail, according to the image display method of the present invention, when a user takes a pose pointing a portion of an image, a digital television detects this and the alpha blend process for the image at the position where the user finger image is superposed is effected to display the synthesis user finger and image. It is therefore possible to make conversations easily and intuitively, while pointing a portion of the image.

In the above description of the embodiments, although the digital television receiver has been used by way of example, the invention is not limited thereto. For example, the invention is also applicable to a set-top box for reproducing an image taken with a digital camera, software for personal computers, and the like.

It is preferable that programs for executing the above-described display method are stored in an image display apparatus, or externally supplied to the image display apparatus.

It is also possible to synthesize a contour dotted line of a specific object and a predetermined image.

This application claims priorities from Japanese Patent Applications No. 2004-058889 filed Mar. 3, 2004 and No. 2005-034854 filed Feb. 10, 2005, which are hereby incorporated by reference herein.

What is claimed is:

1. An image display method comprising:
a display step of displaying a plurality of predetermined images and a moving image on a screen such that the plurality of predetermined images are superimposed respectively on the moving image in such a way that portions of the moving image, corresponding respectively to the plurality of predetermined images, are invisible on the screen;

a detecting step of detecting a specific target from the moving image to be displayed on the screen;

a decision step of deciding whether the specific target detected from the moving image is positioned to be overlapping with at least one of the plurality of predetermined images displayed on the screen; and a control step of controlling said display step in accordance with a decision result of said decision step such that when said decision step decides that the specific target is positioned to be overlapping with the at least one of the plurality of predetermined images, both the at least one of the plurality of predetermined images and the portions of the moving image, corresponding to the at least one of the plurality of predetermined images, are visible on the screen, and when said decision step decides that the specific target is not overlapping with the at least one of the plurality of predetermined images, the portions of the moving image, corresponding respectively to the plurality of predetermined images, remain invisible on the screen, wherein said control step includes performing an alpha blend process in a predetermined synthesis ratio α, with 0<α<1, to make both at least one of the plurality of predetermined images and the portions of the moving image, corresponding to the at least one of the plurality of predetermined images, visible on the screen when said decision step decides that the specific target is positioned to be overlapping with at least one of the plurality of predetermined images.

2. An image display method comprising:

a display unit for displaying a plurality of predetermined images and a moving image on a screen such that the plurality of predetermined images are superimposed respectively on the moving image in such a way that portions of the moving image, corresponding respectively to the plurality of predetermined images, are invisible on the screen;

a detecting step of detecting a specific target from the moving image to be displayed on the screen;

a decision step of deciding whether the specific target detected from the moving image is positioned to be overlapping with at least one of the predetermined plurality of images displayed on the screen; and a control unit for controlling said display step in accordance with a decision result of said decision unit such that when said decision unit decides that the specific target is positioned to be overlapping with the at least one of the plurality of predetermined images, both the at least one of the plurality of predetermined images and the portions of the moving image, corresponding to the at least one of the plurality of predetermined images, are visible on the screen, and when said decision unit decides that the specific target is not overlapping with the at least one of the plurality of predetermined images, the portions of the moving image, corresponding respectively to the plurality of predetermined images, remain invisible on the screen, wherein said control unit includes unit for performing an alpha blend process in a predetermined synthesis ratio α, with 0<α<1, to make both the at least one of the plurality of predetermined images and the portions of the moving image, corresponding to the at least one of the plurality of predetermined images, visible on the screen when said decision unit decides that the specific target is positioned to be overlapping with at least one of the plurality of predetermined images.

3. The image display apparatus according to claim 2, further comprising a transmitting unit for connecting another image display via a network and transmitting the plurality of predetermined images and the moving.

4. An image display apparatus comprising:

a receiving unit for receiving a moving image from another image display apparatus via a network;

a display unit for displaying a plurality of predetermined images and the received moving image on a screen such that the plurality of predetermined images are superimposed respectively on the received moving image in such a way that portions of the received moving image, corresponding respectively to the plurality of predetermined images, are invisible on the screen;

an image inputting unit for inputting a moving image photographed by a camera;

a detecting unit for detecting a specific target from the photographed moving image input by said inputting unit;

a control unit for controlling said display unit such that when the specific target is detected from the photographed moving image by said detecting unit, said display unit displays the plurality of predetermined images and the photographed moving image input by said inputting unit on a screen in such a manner that the plurality of predetermined images are superimposed respectively on the input photographed moving image so that portions of the photographed moving image, corresponding respectively to the plurality of predetermined images, are invisible on the screen; and a decision unit for deciding whether the specific target detected from the input photographed moving image by said detecting unit is positioned to be overlapping with at least one of the predetermined plurality of images displayed on the screen, wherein said control unit controls said display unit in accordance with a decision result of said decision unit such that when said decision unit decides that the specific target is positioned to be overlapping with the at least one of the plurality of predetermined images, both the at least one of the plurality of predetermined images and the portions of the input photographed moving image, corresponding to the at least one of the plurality of predetermined images, are visible on the screen, and when said decision unit decides that the specific target is not overlapping with the at least one of the plurality of predetermined images, the portions of the input photographed moving image, corresponding respectively to the plurality of predetermined images, being invisible on the screen, and wherein said control unit includes a processing unit for performing an alpha blend process in a predetermined synthesis ration α, with 0<α<1, to make both the at least one of the plurality of predetermined images and the portions of the input photographed moving image, corresponding to the at least one of the plurality of predetermined images, visible on the screen when said decision unit decides that the specific target is positioned to be overlapping with the at least one of the plurality of predetermined images.

5. An image displaying apparatus comprising:

a receiving step of receiving a moving image from another image display apparatus via a network;

a display step of displaying a plurality of predetermined images and the received moving image on a screen that the plurality of predetermined images are superimposed respectively on the received moving image in such a way that portions of the received moving image, corresponding respectively to the plurality of predetermined images, are invisible on the screen;

an image inputting step of inputting a moving image photographed by a camera;

a detecting step of detecting a specific target from the photographed moving image input in said image inputting step;

a control step of controlling said display step such that when the specific target is detected from the input photographed moving image in said detecting step, said display step displays the plurality of predetermined images and the photographed moving input in said image inputting step on a screen in such a manner that the plurality of predetermined images are superimposed respectively on the input photographed moving image so that portions of the input photographed moving image, corresponding respectively to the plurality of predetermined images, are invisible on the screen; and a decision step of deciding whether the specific target detected from the input photographed moving image in said detecting step is positioned to be overlapping with at least one of the predetermined plurality of images displayed on the screen, wherein said control step includes controlling said display step in accordance with a decision result of said decision step such that when said decision step decides that the specific target is positioned to be overlapping with the at least one of the plurality of predetermined images, both the at least one of the plurality predetermined images and the portions of the input photographed moving image, corresponding to the at least of the plurality of predetermined images, are visible on the screen, and when said decision step decides that the specific target is not overlapping with the at least one of the plurality of predetermined images, the portions of the input the photographed moving image, corresponding respectively to the plurality of predetermined images, remain being invisible on the screen, and wherein said control step includes a processing step of performing an alpha blend process in a predetermined synthesis ration $\alpha$, with $0<\alpha<1$, to make both the at least one of the plurality of predetermined images and the portions of the input photographed moving image, corresponding to the at least one of the plurality of predetermined images, visible on the screen when said decision step decides that the specific target is positioned to be overlapping with the at least one of the plurality of predetermined images.

* * * * *